US012786532B2

(12) United States Patent
Yu et al.

(10) Patent No.: US 12,786,532 B2
(45) Date of Patent: Nov. 3, 2026

(54) IMAGING MODULE AND ELECTRONIC DEVICE HAVING THE SAME

(71) Applicant: Rayprus Technology (Foshan) Co., Ltd., Foshan (CN)

(72) Inventors: Xun Yu, Shenzhen (CN); Chia-Feng Chang, New Taipei (TW); Mei-Lien Chou, New Taipei (TW); Jyun-Hong Lu, New Taipei (TW)

(73) Assignee: Rayprus Technology (Foshan) Co., Ltd., Foshan (CN)

( * ) Notice: Subject to any disclaimer, the term of this patent is extended or adjusted under 35 U.S.C. 154(b) by 8 days.

(21) Appl. No.: 19/174,000

(22) Filed: Apr. 9, 2025

(65) Prior Publication Data

US 2026/0247015 A1 Aug. 20, 2026

(30) Foreign Application Priority Data

Feb. 17, 2025 (CN) ........................ 202510173620.3

(51) Int. Cl.

*H04N 23/51* (2023.01)
*H04N 23/54* (2023.01)
*H04N 23/55* (2023.01)

(52) U.S. Cl.

CPC ............ *H04N 23/51* (2023.01); *H04N 23/54* (2023.01); *H04N 23/55* (2023.01)

(58) Field of Classification Search

CPC ......... H04N 23/51; H04N 23/54; H04N 23/55
See application file for complete search history.

(56) References Cited

U.S. PATENT DOCUMENTS 7,525,644 B2 * 4/2009 Fujii .................. G03F 7/70841 355/75
2015/0281527 A1 * 10/2015 Mano .................... H04N 23/51 348/374
2016/0373000 A1 * 12/2016 Park ...................... H04N 23/57
2020/0137272 A1 4/2020 Ding et al.
2021/0240001 A1 * 8/2021 Tanaka ..................... G03B 5/00
2024/0089573 A1 3/2024 Li et al.
2024/0251167 A1 * 7/2024 Li ........................ H04N 23/687
2024/0406528 A1 * 12/2024 Peng ...................... H04N 23/54
2025/0110309 A1 * 4/2025 Wang ....................... G02B 7/08

FOREIGN PATENT DOCUMENTS

CN 100481476 C * 4/2009
TW 202018398 A 5/2020
TW 202411759 A 3/2024

* cited by examiner

*Primary Examiner* — Chiawei Chen
(74) *Attorney, Agent, or Firm* — ScienBiziP, P.C.

(57) ABSTRACT

An imaging module includes a substrate including a first surface and a second surface, a welding area, a glue retaining wall, a lens assembly on the second surface, an imaging sensor connected to the first surface by the welding area, and a filling glue layer. The welding area and the glue retaining wall are arranged on a side of the substrate facing away from the second surface, the glue retaining wall is located between the welding area and the opening. An end of the glue retaining wall facing away from the second surface protrudes from and an end of the welding area facing away from the second surface. At least a portion of the filling glue layer is arranged between the imaging sensor and the welding area, and the filling glue layer is located on a side of the glue retaining wall facing away from the light-through hole.

18 Claims, 5 Drawing Sheets

IMAGING MODULE AND ELECTRONIC DEVICE HAVING THE SAME

FIELD

The subject matter herein generally relates to a technical field of optical packaging, and in particular to an imaging module and an electronic device having the imaging module.

BACKGROUND

With the development of imaging modules technology, the size of an imaging sensor in the imaging module becomes smaller and smaller, resulting in new challenges for their packaging technology and assembly process. Especially in the assembly process of the imaging sensor, the requirements for the packaging accuracy of the imaging sensor have become particularly strict. In the assembly process of the imaging sensor, a light-through hole is usually opened on the substrate, the imaging sensor is arranged above the light-through hole, and pads on an edge of the imaging sensor are welded to pads on the surface of the substrate to achieve electrical connection. Filling glue needs to be added between the pads of the imaging sensor and the pads of the substrate to strengthen the connection strength. However, the overflow of the filling glue may flow to the photosensitive area of the imaging sensor, thereby affecting the image quality.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
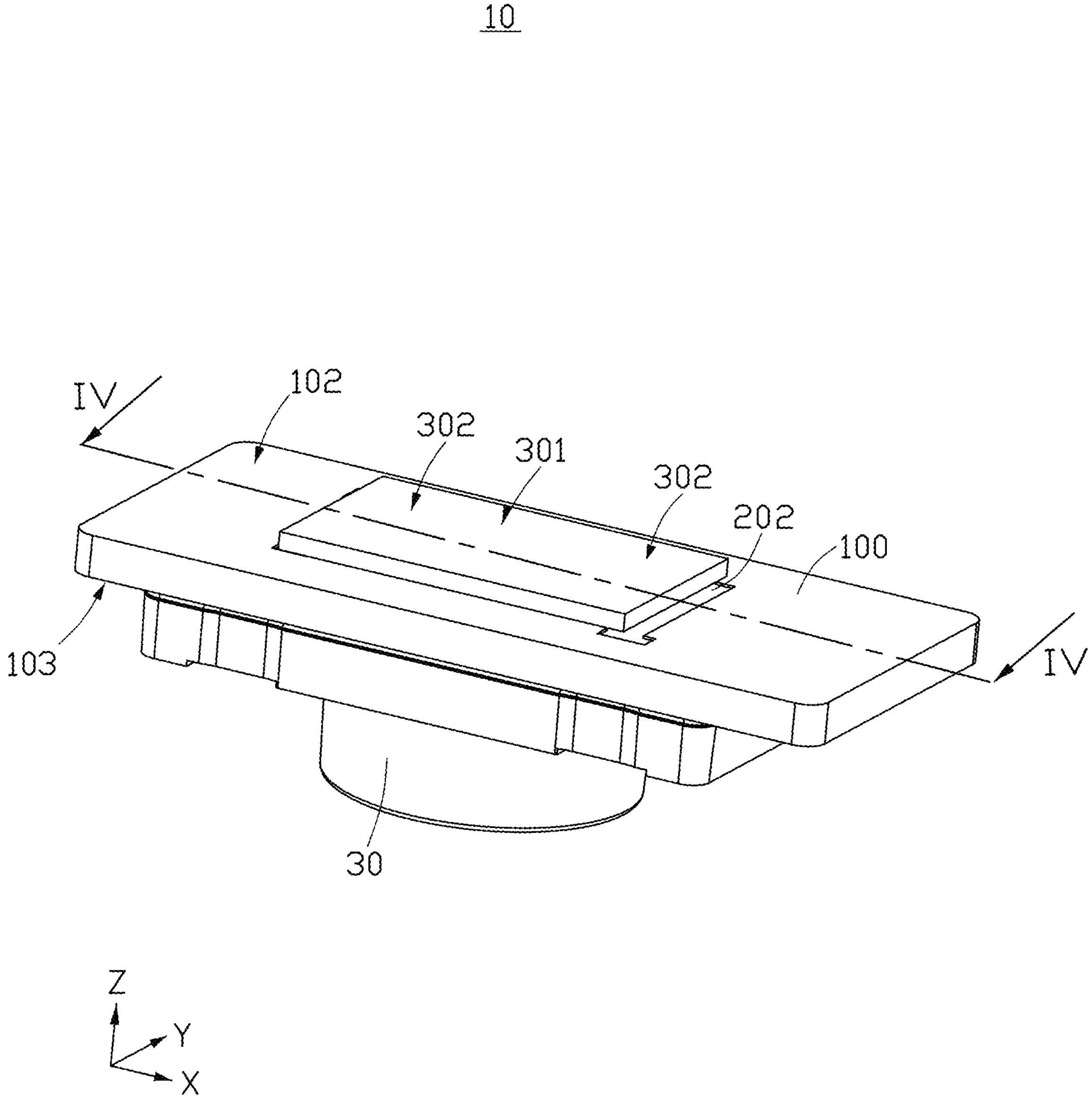
FIG. 1 is a structural schematic view of an imaging module according to an embodiment of the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar components. It should be noted that references to "an" or "one" embodiment in this disclosure are not necessarily to the same embodiment, and such references mean "at least one."

Figure 2:
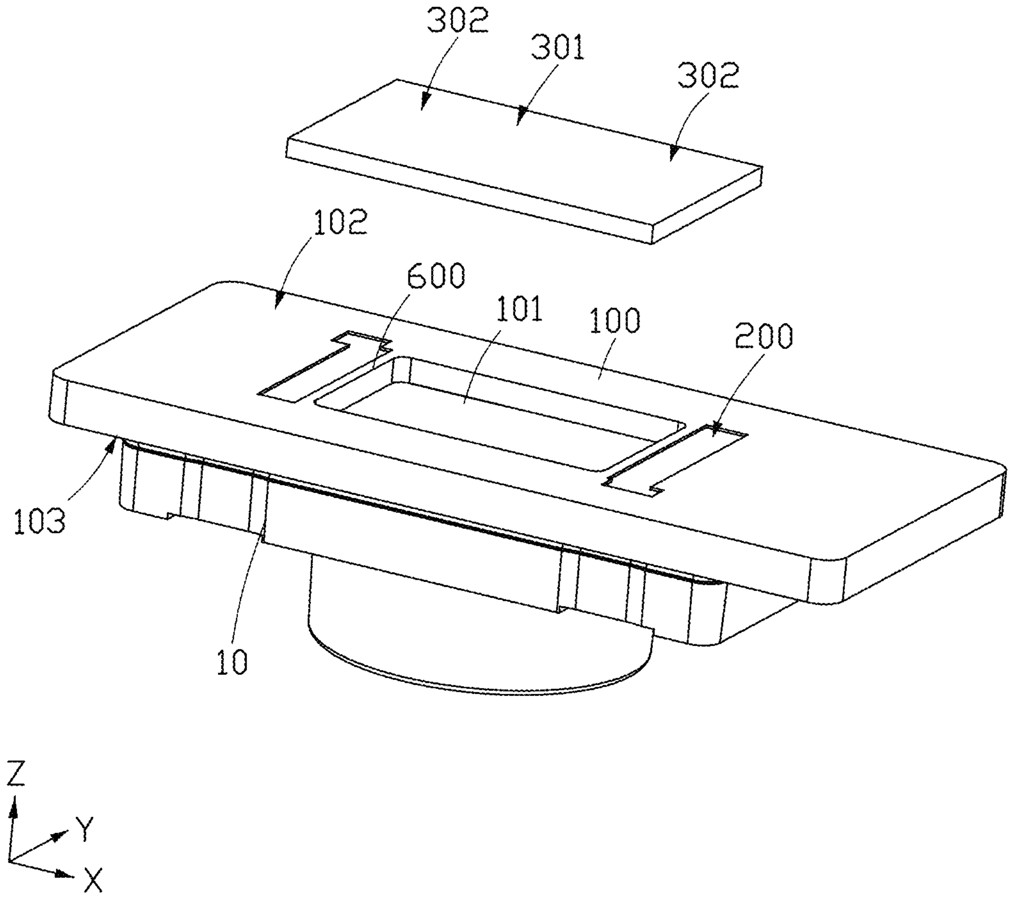
FIG. 2 is an exploded schematic view of an imaging module according to an embodiment of the present disclosure.
Figure 3:
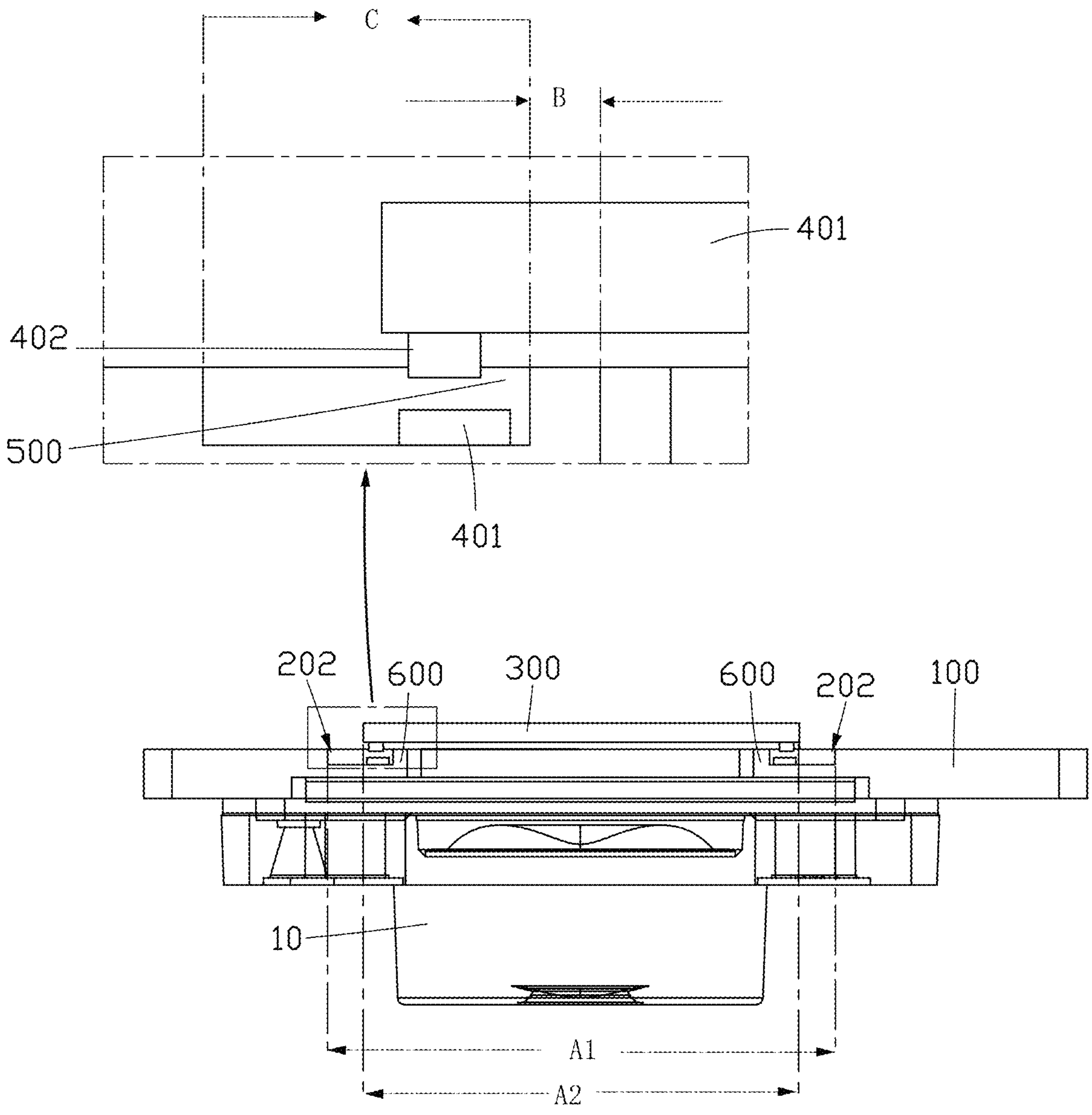
FIG. 3 is a cross-sectional view illustrating the imaging module taken along IV-IV line in FIG. 1.

FIG. 1 illustrates an embodiment of an imaging module 10. Referring to FIGS. 1 to 3, the imaging module 10 includes a substrate 100, a lens assembly 30, an imaging sensor 300, and a filling glue layer 500. The substrate 100 includes a first surface 102 and a second surface 103 facing away from the first surface 102. The substrate 100 further includes a light-through hole 101 penetrating the first surface 102 and the second surface 103. The light-through hole 101 has an opening 101*a* on the first surface 102. The imaging module 10 further includes a welding area 200 and a glue retaining wall 600, the welding area 200 and the glue retaining wall 600 are arranged on a side of the substrate 100 facing away from the second surface 103. The welding area 200 is arranged adjacent to the opening 101*a*, and the glue retaining wall 600 is located between the welding area 200 and the opening 101*a* to separate the welding area 200 and the opening 101*a*. An end of the glue retaining wall 600 facing away from the second surface 103 protrudes from and an end of the welding area 200 facing away from the second surface 103 in a direction away from the second surface 103. In at least one embodiment, two welding areas 200 may be arranged on opposite sides of the opening 101*a* along a first direction X, two glue retaining walls 600 may be arranged on the opposite sides of the opening 101*a* along the first direction X, and one of the glue retaining walls 600 is located between the opening 101*a* and each of the welding areas 200.

The lens assembly 30 is mounted on the second surface 103 and corresponds to the light-through hole 101, and the lens assembly 30 may include a lens holder and at least one lens mounted in the lens holder. The imaging sensor 300 is arranged on the first surface 102. A portion of the imaging sensor 300 corresponds to the light-through hole 101, and external light can pass through the lens of the lens assembly 30, and then pass through the light-through hole 101 and finally be received by the imaging sensor 300. Another portion of the imaging sensor 300 corresponds to and is connected to the welding area 200. The filling glue layer 500 is at least arranged between the imaging sensor 300 and the welding area 200, and the filling glue layer 500 is located on a side of the glue retaining wall 600 facing away from the light-through hole 101.

In the above imaging module 10, the glue retaining wall 600 can effectively prevent the filling glue from overflowing to the light-through hole 101 and the portion of the imaging sensor 300 during the dispensing process, thereby reducing the blocking of the light-through hole 101 and the portion of the imaging sensor 300 by the filling glue, and ensuring the clarity and quality of the optical imaging. The filling glue layer 500 can strengthen the connection strength between the imaging sensor 300 and the substrate 100, improve the mechanical stability of the imaging module 10, and reduce the risk of connection failure caused by thermal expansion and contraction or vibration. Since the impact of the filling glue overflow on the imaging sensor 300 is reduced, which helps to improve the yield rate of the production line and reduce the generation of defective products, thereby reducing production costs in the long term. In at least one embodiment, the substrate 100 may be a circuit board.

The imaging sensor 300 is generally composed of a plurality of photosensitive units, which are responsible for capturing light signals and converting them into electrical signals. In at least one embodiment, the imaging sensor 300 may be a CCD sensor or a CMOS sensor. Referring to FIG. 3, in at least one embodiment, the end of the glue retaining wall 600 facing away from the second surface 103 may be flush with the first surface 102 or as a portion of the first surface 102, which can prevent the overflow of the filling glue during the dispensing process, reduce the glue overflow and contact a photosensitive area 301 of the image sensor 300 corresponding to the light-through hole 101, reduce the risk of increasing the overall thickness of the imaging module 10 due to the setting of the glue retaining wall 600, and further ensure a more uniform contact surface during assembly to help to improve the connection strength and the stability of the overall structure. If the end of the glue retaining wall 600 is lower than the first surface 102 of the substrate 100, a good glue retaining effect cannot be achieved. If the end of the glue retaining wall 600 is higher than the first surface 102 of the substrate 100, it may cause the overall thickness of the imaging module 10 to increase, which is not conducive to the miniaturization development of the imaging module 10.

In at least one embodiment, the imaging sensor 300 includes a photosensitive area 301 and a non-photosensitive area 302 connected to each other, and the non-photosensitive area 302 may be arranged around the photosensitive area 301. The photosensitive area 301 is the portion of the imaging sensor 300 corresponding to the light-through hole 101, which effectively ensures that the imaging sensor 300 can avoid light loss to the greatest extent when receiving the light signal, thereby improving the imaging quality. The non-photosensitive area 302 is welded to the welding area 200, which improves the mechanical strength between the imaging sensor 300 and the substrate 100, thereby enhancing the reliability of the electrical connection. The non-photosensitive area 302 may be made of highly conductive materials, and processed by surface gold plating to improve corrosion resistance and durability. The electrical signal captured by the photosensitive area 301 can be stably and efficiently transmitted to the welding area 200 through the non-photosensitive area 302 for subsequent signal processing.

In at least one embodiment, the welding area 200 includes a welding groove 202 recessed from the first surface 102 toward the second surface 103 and a first connecting portion 400 arranged in the welding groove 202. At least a portion of the filling glue layer 500 is received in the welding groove 202. A second connecting portion 401 is arranged on the non-photosensitive area 302, and the second connecting portion 401 is welded to the first connecting portion 400, which provides a stable electrical connection interface for the image sensor 300. The first connecting portion 400 is arranged in the welding groove 202, so that when the image sensor 300 is electrically connected to the first connection part 400 through the second connection part 401, the overall thickness of the substrate 100 can be reduced. The welding groove 202 can also provide a stable welding environment for the first connection portion 400 and the second connection portion 401, thereby enhancing the reliability and consistency of the welding process. The above design can ensure the firmness of welding and effectively reduce electrical failures caused by poor welding quality. Moreover, the design of the glue retaining wall 600 can effectively guide the filling glue into the welding groove 202 to prevent the filling glue from overflowing, thereby affecting the performance of the imaging sensor 300. In addition, the welding groove 202 also provides a clear positioning for the imaging sensor 300, which is convenient for alignment and fixation during the assembly process, and improves the accuracy and efficiency of the assembly. The first connecting portion 400 and the second connecting portion 401 are welded to each other, which helps to achieve better electrical signal conduction. Through better electrical connection and physical support, the performance of the imaging sensor 300 can be guaranteed, thereby improving the imaging quality and work efficiency of the entire imaging module 10. In at least one embodiment, the first connecting portion 400 may be a welding pad, the second connecting portion 401 may be a welding pad or an electrode.

Figure 4:
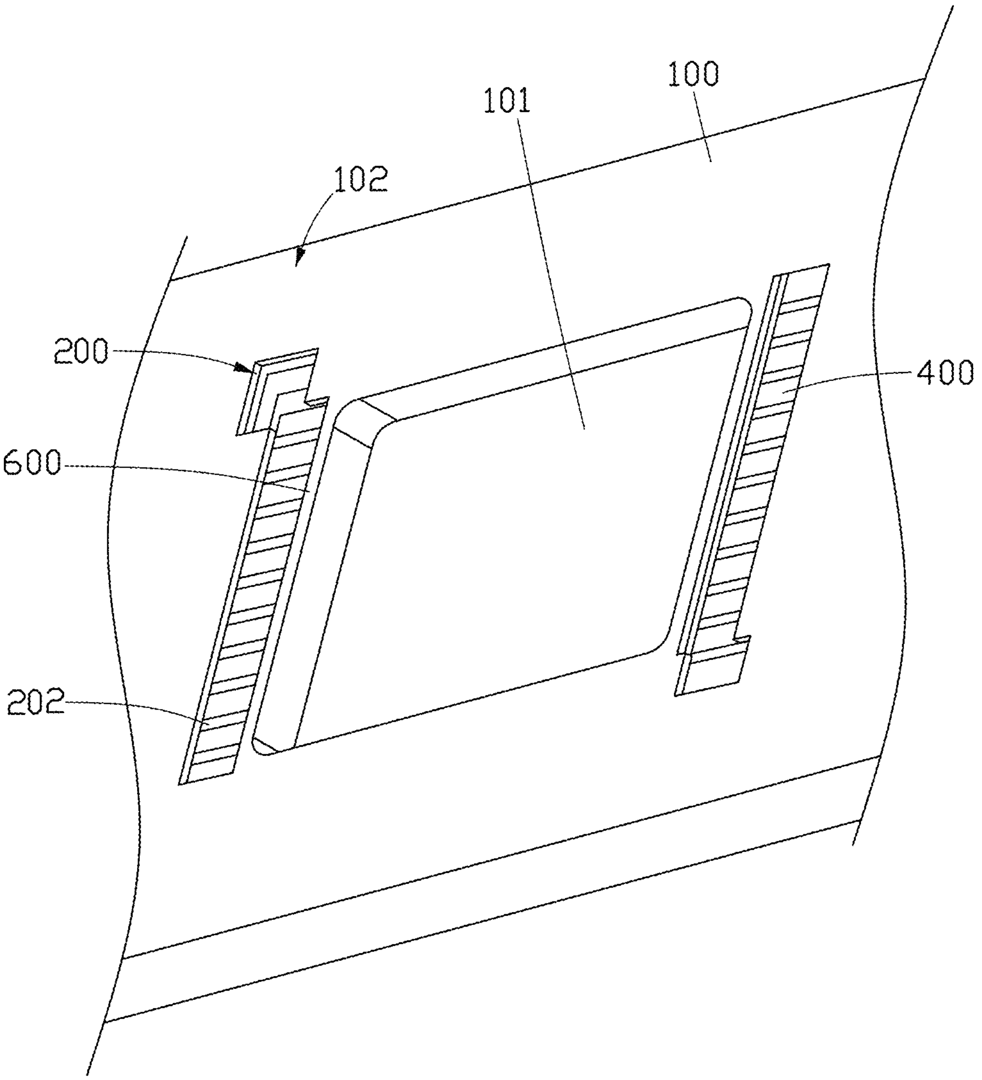
FIG. 4 is an enlarger schematic view of a part of a substrate according to an embodiment of the present disclosure.

Referring to FIG. 4, in at least one embodiment, a conductive material is arranged on the first connecting portion 400, and the second connecting portion 401 is electrically connected to the first connecting portion 400 through the conductive material. The addition of the conductive material can improve the electrical connection strength between the second connecting portion 401 and the first connecting portion 400, ensure the stable transmission of the signal, reduce the contact resistance, and thus improve the response speed and performance of the sensor. The type of the conductive material may be selected according to different application requirements, for example, it may be solder paste, silver paste or copper paste, a flexible design scheme is provided to meet the needs of different environments and working conditions. With the help of the conductive material, a more stable and reliable electrical connection can be achieved between the first connecting portion 400 and the second connecting portion 401. Through the reliable conductive connection, the imaging sensor 300 can achieve more accurate signal processing, thereby improving the imaging quality and response speed of the entire imaging module 10. The reliable conductive connection improves the signal processing capability of the imaging sensor 300. By building a stable electrical connection, the imaging sensor 300 can obtain more accurate signal feedback to ensure that the image quality remains high in various dynamic environments, which is especially important for devices that require real-time imaging and rapid response. For example, in surveillance cameras, smartphones, and autonomous driving systems, fast and accurate image processing is directly related to their performance. By optimizing the application of conductive materials, these devices can perform better in real-world scenarios.

Referring to FIG. 4, in at least one embodiment, at least a part of the second connecting portion 401 may be also received in the welding groove 202, and the filling glue layer 500 may at least cover a welding point of the first connecting portion 400 and the second connecting portion 401. In at least one embodiment, a surface of the filling glue layer 500 facing the imaging sensor 300 may be flush with the end of the glue retaining wall 600 facing away from the second surface 103, which not only effectively ensures that the filling glue will not overflow from the welding groove 202, thereby reducing the impact of the filling glue on the imaging sensor 300 and the light-through hole 101, and helping to maintain the performance and clarity of the imaging sensor 300, but also plays a supporting role, and strengthens the strength and stability of the welding connection, improves the mechanical durability of the solder joint, and reduces the risk of fracture caused by external impact. The filling glue usually has a good thermal conductivity, that is the filling glue may be a heat conducting glue, which helps to achieve more uniform heat dispersion in the welding area 200, prevents local overheating, thereby helping to extend the service life of the imaging sensor 300. The filling glue layer 500 can also improve the sealing of the welding area 200, prevent potential external contaminants such as moisture and dust from invading, thereby ensuring the long-term stable operation of the imaging sensor 300.

Referring to FIG. 3, when the two welding areas 200 are arranged on the opposite sides of the opening 101*a* along the first direction X, the two glue retaining walls 600 are arranged on the opposite sides of the opening 101*a* along the first direction X, and one of the two glue retaining walls 600 is located between the opening 101*a* and each of the two welding areas 200, along the first direction X, a distance from a side of one of the glue retaining walls 600 facing away from the light-through hole 101 to a side of the other of the glue retaining walls 600 facing away from the light-through hole 101 is greater than a width of the photosensitive area 301 of the imaging sensor 300, which is conducive to reducing the risk of glue overflow; along the first direction X, a width A1 from a side of one of the welding areas 200 facing away from the light-through hole 101 to a side of the other of the welding areas 200 facing away from the light-through hole 101 is greater than a width A2 of the imaging sensor 300, so that it is convenient to inject glue in the welding area and it is conducive to improving the quality of the finally formed filling glue layer 500, and it is also conducive to timely heat dissipation at the welding point of the first connecting portion 400 and the second connecting portion 401, thereby reducing the risk of heat accumulation.

Referring to FIGS. 3 and 4, in at least one embodiment, a width B of the glue retaining wall 600 may be in a range of 0.1 mm to 0.2 mm, which is conducive to ensuring the structural stability of the glue retaining wall 600 under pressure and temperature changes and is conducive to the lightweight of the product.

Referring to FIG. 3, in at least one embodiment, a width C of the welding groove 202 along the first direction X may be in a range of 0.01 mm to 0.05 mm. The glue used in the manufacturing process of many modern electronic devices is a high-viscosity fluid. If the size of the welding groove is not appropriate, it will not only affect the coating efficiency, but also may cause the retention of bubbles in the glue, which may cause a decrease in thermal conductivity or abnormal electrical performance in microelectronic devices. Therefore, accurately controlling the width of the welding groove 202 is beneficial to effectively reducing the change in the surface tension of the glue during the coating process and ensuring uniform coating of the glue on the substrate 100.

Figure 5:
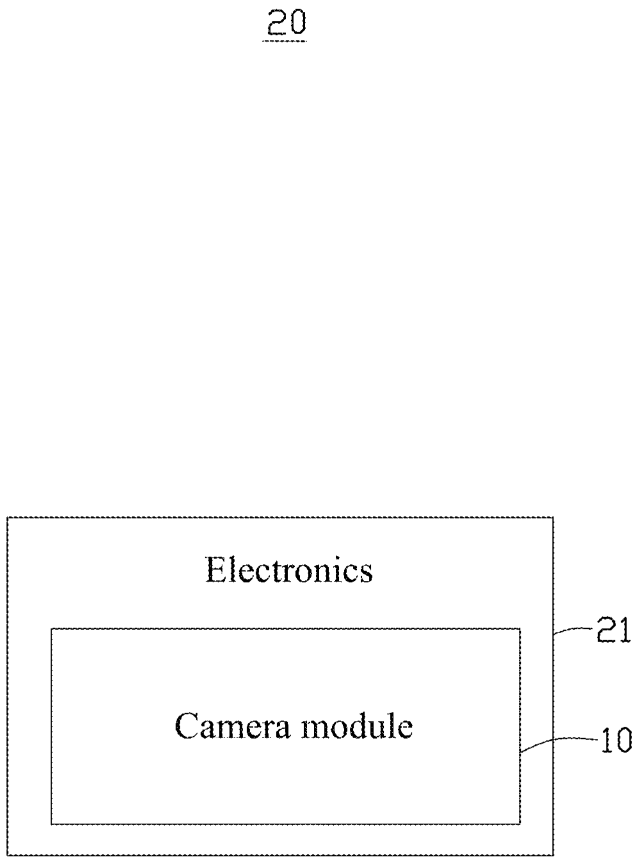
FIG. 5 is a structural schematic view of an electronic device according to an embodiment of the present disclosure.

FIG. 5 illustrates an embodiment of an electronic device 20. The electronic device 20 includes a housing 21 and the above imaging module 10, and the imaging module 10 is arranged in the housing 21. The electronic device 20 may be, but not limited to, a phone, a table, a drone, or a digital camera. Through reasonable spatial layout and circuit design, the imaging module 10 can be compactly placed in the housing 21 to reduce the occupied space, while ensuring the stability of heat dissipation and signal transmission, thereby achieving efficient performance and user-friendly experience. The imaging module 10 effectively improves the bottom filling glue overflowing to the photosensitive area 301 of the image sensor 300 during the dispensing process by setting the glue retaining wall 600, ensuring that the development effect is not affected. By setting the glue retaining wall 600 adjacent to the welding area 200, the position and amount of the filling glue can be better controlled, thereby improving the packaging accuracy of the entire imaging module 10 and ensuring reliable connection between the components. With the gradual miniaturization of the imaging sensor 300, this design can adapt to more complex assembly conditions and meet the needs of modern electronic products for miniaturization and high performance. It can also effectively reduce the failure rate caused by the overflow of the filling glue, thereby reducing the time and cost of reprocessing and testing, and improving production efficiency.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An imaging module comprising:

a substrate comprising a first surface and a second surface facing away from the first surface, a light-through hole penetrating the first surface and the second surface, the light-through hole defining an opening on the first surface;

a welding area;

a glue retaining wall;

a lens assembly mounted on the second surface;

an imaging sensor arranged on the first surface; and a filling glue layer;

wherein the welding area and the glue retaining wall are arranged on a side of the substrate facing away from the second surface, the welding area is arranged adjacent to the opening, and the glue retaining wall is located between the welding area and the opening to separate the welding area and the opening, an end of the glue retaining wall facing away from the second surface protrudes from and an end of the welding area facing away from the second surface in a direction away from the second surface; the imaging sensor is connected to the substrate via the welding area, at least a portion of the filling glue layer is arranged between the imaging sensor and the welding area, and the filling glue layer is located on a side of the glue retaining wall facing away from the light-through hole.

2. The imaging module of claim 1, wherein the end of the glue retaining wall facing away from the second surface is flush with the first surface.

3. The imaging module of claim 1, wherein the imaging sensor comprises a photosensitive area and a non-photosensitive area connected to each other, the photosensitive area corresponds to the light-through hole, and the non-photosensitive area is welded to the welding area.

4. The imaging module of claim 3, wherein the welding area comprises a welding groove recessed from the first surface toward the second surface and a first connecting portion arranged in the welding groove, at least a portion of the filling glue layer is received in the welding groove, a second connecting portion is arranged on the non-photosensitive area, and the second connecting portion is welded to the first connecting portion.

5. The imaging module of claim 4, wherein a conductive material is arranged on the first connecting portion, and the second connecting portion is electrically connected to the first connecting portion through the conductive material.

6. The imaging module of claim 4, wherein at least a part of the second connecting portion is received in the welding groove.

7. The imaging module of claim 4, wherein along an arrangement direction of the light-through hole and the welding area, a width of the welding groove is in a range of 0.01 mm to 0.05 mm.

8. The imaging module of claim 1, wherein along an arrangement direction of the light-through hole and the welding area, a width of the glue retaining wall is in a range of 0.1 mm to 0.5 mm.

9. The imaging module of claim 1, wherein the imaging module further comprises another welding area and another glue retaining wall, the welding areas are arranged on opposite sides of the opening along a first direction, the glue retaining walls are arranged on the opposite sides of the opening along the first direction, and one of the glue retaining walls is located between the opening and each of the welding areas.

10. An electronic device comprising:

a housing; and an imaging module in the housing, the imaging module comprising:

a substrate comprising a first surface and a second surface facing away from the first surface, a light-through hole penetrating the first surface and the second surface, the light-through hole defining an opening on the first surface;

a welding area;

a glue retaining wall;

a lens assembly mounted on the second surface;

an imaging sensor arranged on the first surface; and a filling glue layer;

wherein the welding area and the glue retaining wall are arranged on a side of the substrate facing away from the second surface, the welding area is arranged adjacent to the opening, and the glue retaining wall is located between the welding area and the opening to separate the welding area and the opening, an end of the glue retaining wall facing away from the second surface protrudes from and an end of the welding area facing away from the second surface in a direction away from the second surface; the imaging sensor is connected to the substrate via the welding area, at least a portion of the filling glue layer is arranged between the imaging sensor and the welding area, and the filling glue layer is located on a side of the glue retaining wall facing away from the light-through hole.

11. The electronic device of claim 10, wherein the end of the glue retaining wall facing away from the second surface is flush with the first surface.

12. The electronic device of claim 10, wherein the imaging sensor comprises a photosensitive area and a non-photosensitive area connected to each other, the photosensitive area corresponds to the light-through hole, and the non-photosensitive area is welded to the welding area.

13. The electronic device of claim 12, wherein the welding area comprises a welding groove recessed from the first surface toward the second surface and a first connecting portion arranged in the welding groove, at least a portion of the filling glue layer is received in the welding groove, a second connecting portion is arranged on the non-photosensitive area, and the second connecting portion is welded to the first connecting portion.

14. The electronic device of claim 13, wherein a conductive material is arranged on the first connecting portion, and the second connecting portion is electrically connected to the first connecting portion through the conductive material.

15. The electronic device of claim 13, wherein at least a part of the second connecting portion is received in the welding groove.

16. The electronic device of claim 13, wherein along an arrangement direction of the light-through hole and the welding area, a width of the welding groove is in a range of 0.01 mm to 0.05 mm.

17. The electronic device of claim 10, wherein along an arrangement direction of the light-through hole and the welding area, a width of the glue retaining wall is in a range of 0.1 mm to 0.5 mm.

18. The electronic device of claim 10, wherein the imaging module further comprises another welding area and another glue retaining wall, the welding areas are arranged on opposite sides of the opening along a first direction, the glue retaining walls are arranged on the opposite sides of the opening along the first direction, and one of the glue retaining walls is located between the opening and each of the welding areas.

* * * * *